US008199752B2

(12) United States Patent
Swanson et al.

(10) Patent No.: US 8,199,752 B2
(45) Date of Patent: Jun. 12, 2012

(54) ENHANCED ANYCAST FOR EDGE SERVER SELECTION

(75) Inventors: Wylie Swanson, Tempe, AZ (US);
 Bryan D. Black, Tempe, AZ (US);
 Nathan F. Raciborski, Phoenix, AZ (US); Jacob S. Roersma, Grand Rapids, MI (US); Colin Rasor, Tempe, AZ (US);
 Albert P. Tobey, Tempe, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 152 days.

(21) Appl. No.: 12/767,746

(22) Filed: Apr. 26, 2010

(65) Prior Publication Data

US 2011/0082916 A1    Apr. 7, 2011

Related U.S. Application Data

(60) Provisional application No. 61/248,380, filed on Oct. 2, 2009, provisional application No. 61/248,381, filed on Oct. 2, 2009.

(51) Int. Cl.
 *H04L 12/28* (2006.01)
 *H04L 12/56* (2006.01)
(52) U.S. Cl. ......... 370/389; 370/401; 709/203; 709/223
(58) Field of Classification Search ........................ None
 See application file for complete search history.

(56) References Cited

U.S. PATENT DOCUMENTS

| 6,785,704 | B1 | 8/2004 | McCanne |
| 7,269,157 | B2 | 9/2007 | Klinker et al. |
| 7,574,499 | B1 | 8/2009 | Swildens et al. |
| 7,904,541 | B2 * | 3/2011 | Swildens et al. ............... 709/223 |
| 2002/0065899 | A1 | 5/2002 | Smith et al. |
| 2003/0079027 | A1 | 4/2003 | Slocombe et al. |
| 2004/0114569 | A1 | 6/2004 | Naden et al. |
| 2005/0010653 | A1 * | 1/2005 | McCanne ...................... 709/219 |
| 2006/0233155 | A1 | 10/2006 | Srivastava |
| 2006/0271705 | A1 | 11/2006 | Garcia-Luna-Aceves |
| 2008/0062990 | A1 | 3/2008 | Oran |
| 2008/0235400 | A1 | 9/2008 | Slocombe et al. |
| 2009/0113057 | A1 | 4/2009 | Van Der Merwe et al. |
| 2011/0035497 | A1 * | 2/2011 | Daly et al. ..................... 709/226 |
| 2011/0082916 | A1 * | 4/2011 | Swanson et al. ............... 709/219 |

OTHER PUBLICATIONS

International Search Report dated May 31, 2011 for International Application No. PCT/US2010/051195, 3 pages.
Anycast Addressing on the Internet, Kuro5hin, pp. 1-7, Printed Oct. 2, 2006.
Anycast Wikipedia, pp. 1-3, Printed Oct. 2, 2006.
Green, M. et al., "Content internetworking architecture overview", IETF Internal Draft, Feb. 22, 2002.
Buyya, Rajkumar et al., "A Case for Peering of Content Delivery Networks", pp. 1-14, Aug. 1, 2007.

* cited by examiner

*Primary Examiner* — Robert Scheibel
(74) *Attorney, Agent, or Firm* — Kilpatrick Townsend & Stockton LLP

(57) ABSTRACT

Systems and methods for gathering distributed information to improve routing that uses Anycast for assigning deliveries between a number of geographically-distant points of presence (POPs) are disclosed. The POPs share the same Internet protocol (IP) address. According to Anycast resolution, the Internet aids in assigning a content request initially to a POP. Delivery statistics are gathered from deliveries a the number of POPs and possibly other sources. Where it is determined that Anycast found the wrong POP, the content request is reassigned to another POP.

20 Claims, 10 Drawing Sheets

ENHANCED ANYCAST FOR EDGE SERVER SELECTION

This application claims the benefit of and is a non-provisional of U.S. Provisional Application Ser. No. 61/248,380 filed on Oct. 2, 2009; and U.S. Provisional Application Ser. No. 61/248,381 filed on Oct. 2, 2009; which are hereby expressly incorporated by reference in their entirety for all purposes.

This application is related to co-pending U.S. patent application Ser. No. 12/767,747 filed on Apr. 26, 2010, entitled "REAL-TIME MESSAGE QUEUING FOR A PROCESSING RING", which is hereby expressly incorporated by reference in its entirety for all purposes.

BACKGROUND

This disclosure relates in general to routing deliveries and, but not by way of limitation, to improving Anycast routing for a distributed group of points of presence (POPs).

CDNs provide enhanced delivery of content with many optimizations. One optimization is to assign a nearby POP to deliver a request such that in a network-sense the sender and receiver are close by with few hops, little latency and/or however else quality of service (QoS) is defined. Anycast can be used to allow the Internet to assign a request to a nearby POP. In some cases, the POP assigned to an end user with Anycast may not be the most favorable location to receive content. For example, a user in Phoenix could use a POP in New York in some circumstances likely providing less than optimum QoS.

Delivery of content is greatly affected by how the broader Internet is behaving in real time or near real time. There are services that provide Internet health information that is gathered and periodically made available. This can be useful to some, but does not provide recent enough information for many decisions a CDN or other large-scale user of the Internet would require to provide high levels of QoS. General trends provided by infrequent updates does not provide the timely information to make some delivery decisions.

SUMMARY

In one embodiment, the present disclosure describes systems and methods for gathering distributed information to improve routing that uses Anycast for assigning deliveries between a number of geographically-distant points of presence (POPs). The POPs share the same Internet protocol (IP) address. According to Anycast resolution, the Internet aids in assigning a content request initially to a POP. Delivery statistics are gathered from deliveries a the number of POPs and possibly other sources. Where it is determined that Anycast found the wrong POP, the content request is reassigned to another POP.

In another embodiment, the present disclosure describes a content delivery network (CDN) for delivering content of others with the Internet using a plurality of POPs. The CDN includes a first and second POPs and a switch fabric. The first POP is accessible using an Internet protocol (IP) address. The first POP comprises a plurality of first edge servers that each are configured to deliver content to end user devices. The second POP accessible using the IP address. The plurality of POPs comprise the first POP and the second POP where the second POP is geographically separated from the first POP. The second POP includes a plurality of second edge servers that each are configured to deliver content to end user devices. The switch fabric that assigns a request for content received at the first POP to one of the plurality of second edge servers when the second POP is determined likely to provide improved delivery of the content object of the request.

In still another embodiment, the present disclosure describes a method for assigning delivery resources in a CDN between a plurality of POPs. A request is received to deliver a content object to an end user at a first POP. The first POP comprises a plurality of first edge servers. The plurality of POPs includes the first POP and a second POP. The first POP is geographically distant from the second POP. It is determined that the second POP is likely to provide improved delivery of the content object to the end user in comparison to the first POP. The second POP comprises a plurality of second edge servers. The first POP and the second POP are accessed from the Internet with a same IP address. The request is assigned to one of the plurality of second edge servers.

In yet another embodiment, the present disclosure describes a method for assigning delivery resources in a distributed delivery network having a plurality of POPs that uses Anycast to assist in assigning content requests. A request is received to deliver a content object to an end user at a first POP. The plurality of POPs includes the first POP and a second POP. It is determined that the second POP is likely to provide improved delivery of the content object to the end user in comparison to the first POP. The plurality of POPs comprise the first POP and the second POP where first and second POPs share the same IP address. The first POP is geographically distant from the second POP. The first POP and the second POP are accessed from the Internet using a same IP address. The request is re-assigned to the second POP for delivery of the content object to the end user.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment (s) will provide those skilled in the art with an enabling description for implementing a preferred exemplary embodiment. It is understood that various changes may be made in the function and arrangement of elements without departing from the spirit and scope as set forth in the appended claims.

Figure 1:
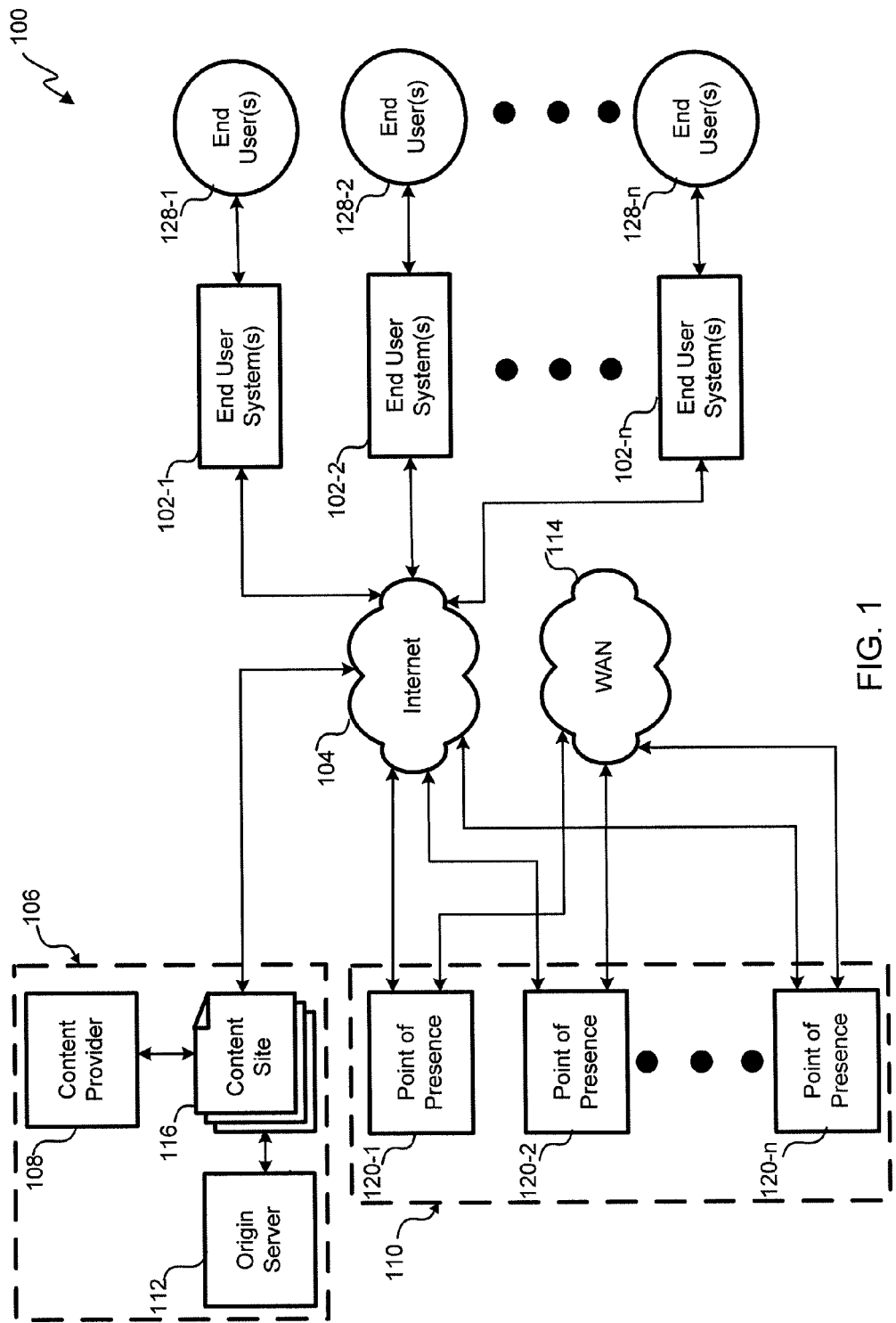
FIG. 1 depicts a block diagram of an embodiment of a content distribution system.

Referring first to FIG. 1, a block diagram of an embodiment of a content distribution system 100 is shown. The content originator 106 offloads delivery of the content objects to a content delivery network (CDN) 110 in this embodiment. The content originator 106 produces and/or distributes content objects and includes a content provider 108, a content site 116, and an origin server 112. The CDN 110 can cache, redistribute and/or host content in various embodiments for third parties to offload delivery and typically provide better quality of service (QoS).

In this embodiment, the content distribution system 100 locates the content objects (or portions thereof) and distributes the content objects to an end user system 102 or processing subscribers (not shown). The content objects are dynamically cached or processed within the CDN 110 to improve the QoS without replicating the whole content object, unless subsequently requested by the end user 128. A content object is any content file or content stream and could include, for example, video, pictures, data, audio, software, and/or text. For example, a content object could be gathered information or a content stream from a messaging queue. The content object could be live, delayed or stored. The content object could be gathered information, which is streamed to or from the CDN 110 in real time or near real time. Throughout the specification, references may be made to a content object, content, content stream and/or content file, but it is to be understood that those terms could be used interchangeably wherever they may appear.

Many content providers 108 use a CDN 110 to deliver the content objects over the Internet 104 to end users 128. The CDN 110 includes a number of points of presence (POPs) 120, which are geographically distributed through the content distribution system 100 to deliver content. Various embodiments may have any number of POPs 120 within the CDN 110 that are generally distributed in various locations around the Internet 104 to be proximate to end user systems 102. Multiple POPs 120 use the same IP address such that an Anycast routing scheme is used to find a POP 120 likely to be close to the end user in a network sense for each request. In addition to the Internet 104, a wide area network (WAN) 114 or other backbone may couple the POPs 120 with each other and also couple the POPs 120 with other parts of the CDN 110.

When an end user 128 requests a web page through its respective end user system 102, the request for the web page is passed either directly or indirectly via the Internet 104 to the content originator 106. The content originator 106 is the source or re-distributor of content objects. The content site 116 is a \ web site accessible by the end user system 102. In one embodiment, the content site 116 could be a web site where the content is viewable with a web browser. In other embodiments, the content site 116 could be accessible with application software other than a web browser. The content provider 108 directs content requests to a CDN 110 after they are made or formulates the delivery path by embedding the delivery path into the URLs for a web page in this embodiment. In any event, the request for content is handed over to the CDN 110 in this embodiment by using an Anycast IP address corresponding to two or more POPs 120.

Once the request for a content object is passed to the CDN 110, the request is associated with a particular POP 120 within the CDN 110 using the Anycast routing scheme. The particular POP 120 may retrieve the portion of the content object from the content provider 108. Alternatively, the content provider 108 may directly provide the content object to the CDN 110 and its associated POPs 120 through prepopulation, i.e., in advance of the first request. In this embodiment, the content objects are provided to the CDN 110 and stored in one or more CDN servers such that the portion of the requested content may be served from the CDN 110. The CDN servers include edge servers that actually serve end user requests. The origin server 112 holds a copy of each content object for the content originator 106. Periodically, the content of the origin server 112 may be reconciled with the CDN 110 through a cache, hosting and/or pre-population algorithm. Some content providers could use an origin server within the CDN 110 to host the content and avoid the need to maintain a copy.

Once the content object is retrieved from the origin server 112 by the CDN 110, the content object is stored within the particular POP 120 and is served from that POP 120 to the end user system 102. Streamed content objects can have real time or near real time information or can be previously stored. The end user system 102 receives the content object and processes it for use by the end user 128 or an automated processing systems. The end user system 102 could be a personal computer, media player, handheld computer, Internet appliance, phone, IPTV set top, web server, processing system, streaming radio or any other device that receives and/or plays content objects. In some embodiments, a number of the end user systems 102 could be networked together. Although this embodiment only shows a single content originator 106 and a single CDN 110, it is to be understood that there could be many of each in various embodiments.

This CDN 110 allows efficient gathering of real time information for distribution both inside and outside of the CDN 110. External data agents could provide information to different POPs 120 in different cities that is aggregated by the CDN 110 into a content stream from a messaging queue 226 for processing in yet another location by receiving the content stream from a nearby POP 120. The WAN 114 can be far more efficient and secure when distributing content between POPs 120 in embodiments. Additionally, processing subscribers can get the benefit of similar information being available in a content stream to provide a broader sampling of information to base processing decisions upon.

Figure 2:
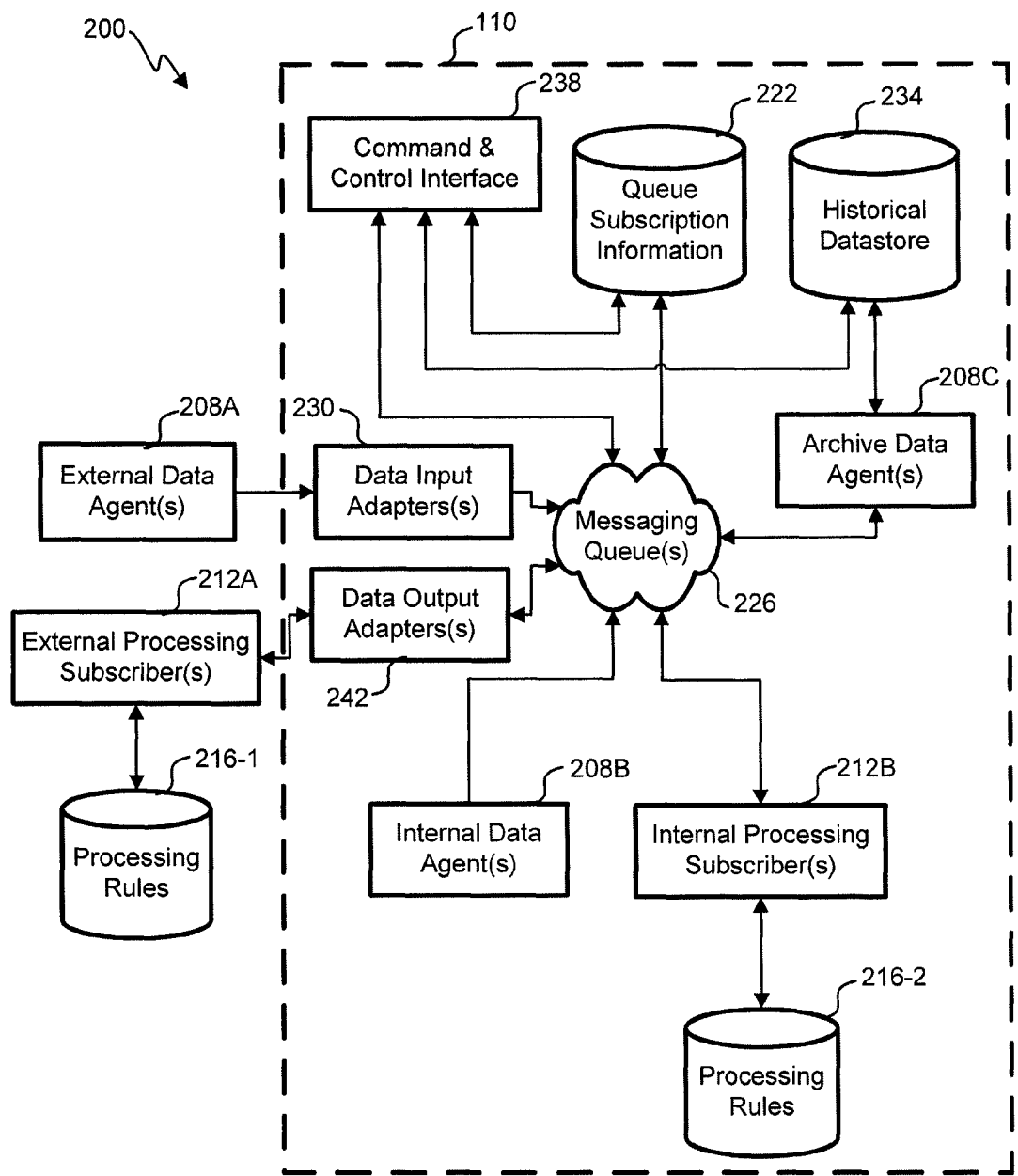
FIG. 2 depicts a block diagram of an embodiment of a data processing system.

Referring to FIG. 2, an embodiment of a data processing system 200 is shown that uses the CDN 110 infrastructure to efficiently share information in real time or near real time. The data processing system 200 performs internal data gathering and processing of streamed content along with external data gathering and processing in this embodiment. Other embodiments could have either all external or all internal data gathering. The data processing system 200 allows reporting timely information that might be of interest to the reporting party or other parties. The data processing system 200 can monitor gathered information from several sources to allow it to make timely business and/or processing decisions based upon that information. For example, reports on the health of various links on the Internet could be gathered and reported to the data processing system 200 from a number of sources to allow the data processing system 200 to route delivery requests to edge servers that are relatively free of Internet congestion. By gathering information from many sources, the reliability of the gathered information increases in the aggregate such that subscribers can use the aggregated information or content stream to make better decisions in one embodiment.

The CDN 110 is used for a number of purposes to include the aggregation and distribution of gathered information as discussed above. Additionally, the CDN 110 performs processing of the gathered information for internal purposes or as a service for others in this embodiment. Although not detailed in FIG. 2, the CDN 110 can perform more traditional tasks like distributing content for others by caching content from origin servers or hosting content as the origin server. Those blocks associated with distributing content are not detailed in the CDN 110 shown in FIG. 2. Other embodiments of the CDN might not perform the traditional content delivery instead focusing the CDN on performing as a clearinghouse for gathered information in various stages of processing and aggregation.

Internally, the CDN 110 gathers information from one or more internal data agents 208B. The internal data agents 208B gather information relating to such things as delivery performance, resource loading, bandwidth cost, customer provisioning, business intelligence, etc. FIG. 2 shows a single internal and external data agent 208 for simplicity, but it is to be understood that there could be any number of internal and external data agents 208. The internal data agents 208B can report the gathered information in real-time, near real-time or along another time line. To account for any delay in reporting information, a time stamp or staleness indicator can inform others of how timely the information was sampled. The CDN 110 can opt to allow third parties to use internally or externally gathered information that is aggregated within the CDN 110 by subscription of the external processing subscriber(s) 212A for the third party.

A command and control (CC) interface 238 configures the gathered input information to and output of content streams from the CDN 110. APIs for accepting gathered information and providing content streams are provided to third parties external to the CDN 110 who want to subscribe to content streams. The CDN 110 or a third party can designed an as yet undefined APIs using the CC interface 238. The CDN 110 can also define authorization and authentication parameters using the CC interface 238 such as authentication, authorization, login, and/or data encryption. CC information is passed to the various data agents 208 and processing subscribers 212 through a channel separate from the gathered information or content stream in this embodiment, but other embodiments could embed CC information in these communication channels. The CC information allows throttling information reporting frequency, specifying formats for information and content streams, deactivation of a data agent 208 or processing subscriber 212, updating authentication and authorization, etc.

The various content streams that are available can be researched and explored through the CC interface 238. Those content stream selections for a particular processing subscriber 212 are stored in the queue subscription information 222. The CDN 110 then routes selected content streams to processing subscribers 212 that have selected delivery of a given content stream. Additionally, the CDN 110 also supports historical queries of the various content streams that are stored in an historical datastore 234 as gathered by an archive data agent 208C. The archive data agent 208C supports running of hypothetical queries against historical messaging queue information to test how algorithms running at a processing subscriber 212 would react, for example, to content streams gathered in the past. Through the CC interface 238 various content streams can be selected for archiving into the historical datastore 234.

External data agents 208A can also gather information that is reported to the CDN 110 in real-time, near real-time or along another time line. There is a defined API between the data agent 208 and the CDN 110. Each type of information or variable collected by CDN 110 falls within a defined API or multiple APIs. In some cases, the CC interface 238 is used to define additional variables to modify an API that might be of use to processing subscribers 212. The additional variables can be passed to all processing subscribes 212 or just a subset. For example, a data agent 208 may report last mile bandwidth achieved and a subscriber identifier associate with the test, but define the subscriber identifier as a private variable that would not be passed to processing subscribers 212 outside its domain. Processing subscribers 212 within its domain would receive the subscriber identifier along with bandwidth reports reported by its own data agents 208. Encryption and/or unique addressing of content streams or sub-streams can be used to hide the private variables within the messaging queues.

Some types of information may have standard APIs. The developer can specify or suggest a new API through the CC interface 238 as new sources of information are characterized and provided. An example of an API that reports delivery health information could be one that accepts source IP address, destination IP address, streaming rate, latency, reliability, and sample time. With enough data agents 208 reporting delivery health from within the CDN 110 or externally, an aggregation of that information can be used for any number of purposes.

Some embodiments charge for receiving content streams by external processing subscribers 212A. The cost can be per record, per byte or per subscription. Some embodiments offset credit for gathered information provided from external data agents 208A against the cost for content streams to external processing subscribers 212A. For example, each gathered information record provided to the CDN 110 would result in a free data record from the content stream in one embodiment. Generally, data in the aggregated content stream becomes a more reliable sampling with more entities reporting information. The CDN 110 can negotiate pricing for information provided and information consumed through costing information accessible through the CC interface 238.

External data agents 208A communicate with the CDN 110 through an interface or data input adapter 230. FIG. 2 only shows a single external data agent 208A, although it is to be understood that there could be hundreds, thousands or millions of external data agents 208 in various embodiments. The communication with the data input adapter 230 can be encrypted or not. For example, a socket using a TCP connection could be used. In addition to TCP, other transport layer protocols like SCTP and UDP could be used in some embodiments to intake the gathered information. A protocol such as SSL could be used to protect the information over the TCP connection. Authentication and authorization can be performed to any external data agent 208A interfacing to the CDN 110. The data input adapter 230 receives the information from an external data agent 208A by providing the API and any encryption, authorization, and/or authentication. In some cases, the data input adapter 230 reformats or rearranges the information from the external data agent 208A.

Although not shown, some embodiments could use a data input adapter 230 for an internal data agent 208B.

The CDN 110 has a number of POPs 120 geographically distributed such that most external data agents 208A and processing subscribers 212A are relatively close to a POP 120. External data agents 208A and external processing subscribers 212A are assigned to a particular POP 120 using Anycast, DNS resolution, redirection, or other methods to use a nearby POP 120 with adequate QoS. The POP 120 to use for gathered information or content streams may be chosen to reduce the number of POPs 120 sending a particular stream, limit loading of a POP 120, speed latency in gathering or streaming of information, or satisfy other requirements. A processing ring could be fixed to the specified POP to use for each data agent 208 and processing subscriber 212.

The messaging queue 226 takes all the information from the data agents 208 and distributes the gathered information as a content stream to any processing subscribers 212 that have requested the content stream from the messaging queue 226. The messaging queue 226 may be in a single POP 120, a central location or distributed among a number of POPs 120. Only content streams within the messaging queue 226 that a particular processing subscriber 212 has subscribed to may be read by that processing subscriber 212 if received at all. Gathered information sent to the messaging queue 226 is processed and returned in a content stream in a fraction of a second by the messaging queue 226. Various multicasting and routing techniques can be used to distribute a content stream from the messaging queue 226 that a number of processing subscribers 212 have requested. Protocols such as Multicast or multiple Unicast could be used to distributed streams within the messaging queue 226. Additionally, transport layer protocols like TCP, SCTP and UDP could be used in various embodiments.

Through the CC interface 238, an external or internal processing subscriber 212A, 212B can be assigned one or more content streams within the messaging queue 226. A content stream is a particular type of messages in a particular category. For example, six data agents 208 could all report content delivery metrics as information passed through the messaging queue 226 into a given content stream. One or more processing subscribers 212 could subscribe and receive the content stream to process the information and make a decision and/or feed the output from the processing as gathered information fed back into the messaging queue 226. Through the CC interface 238 a developer can search the available content streams or specify a new content stream and its API. The new content stream might be determined by processing a number of existing content streams with a processing subscriber 212.

The CDN 110 has internal processing subscribers 212B that process assigned content streams to perform functions within the CDN 110. Internal processing subscribers 212B could perform functions such as provisioning new accounts or improving routing based upon one or more content streams from the messaging queue 226. Processing rules 216-2 are provided to the internal processing subscriber 212B to provide algorithms, rules, instructions, and/or software that define how the subscribed content streams are processed.

Processing rules 216-2 can decide filtering and weighting of records from the content stream. To the extent that decisions are made based upon analysis of the content stream, each data record is time stamped to reflect when the information was gathered such that additional credibility could be given to more recent results, for example. Other embodiments may filter out records in the content stream that are from an unreliable source or stale. For example, a particular contributor of information may prove to have less than optimal gathered information and that could be weighted very low or removed altogether. For external processing subscribers 212A, the filtering could be done by the data output adapter 242 to reduce bandwidth passing from the CDN 110.

Internal processing subscribers 212B may additionally process one or more content streams to provide different information to feed back into the messaging queue 226 to be part of a different content stream. For example, hundreds of external data agents 208 could provide geographically correlated temperature measurements that are put into a content stream on the messaging queue 226. An internal processing subscriber 212B could receive the content stream and process it into topographic heat map that is supplied back as gathered information passed onto the messaging queue 226, for possible use by other internal and external processing subscribers 212. The various data agents 208 and processing subscribers 212 arranged in a chain form a processing loop.

External processing subscribers 212A act similarly to internal processing subscribers 212B, but for third parties that are not part of the CDN 110. The external processing subscribers 212A interface with the CDN 110 through data output adapters 242. Data output adapters 242 can perform authentication, authorization, reformatting, filtering, encryption, etc. External processing subscribers 212A can ingest content streams from the messaging queue 226, but they can also act as an external data agent in some cases by returning processed information back into the messaging queue 226. Processing rules 216-1 define how the external processing subscribers 212A will process the subscribed content streams.

As mentioned above, the CC interface 238 allows the CDN 110 to query historical messaging queue 226 information. An archive data agent 208C listens to the messaging queue 226 to store content streams in a historical database 234. The historical database 234 may store content streams for varying amounts of time and may not store all content streams. Different content streams may be stored for different amounts of time. For example, temperature readings for a refrigerator may be put on the messaging queue 226 but only stored if beyond some threshold that corresponds to a failure.

Figure 3:
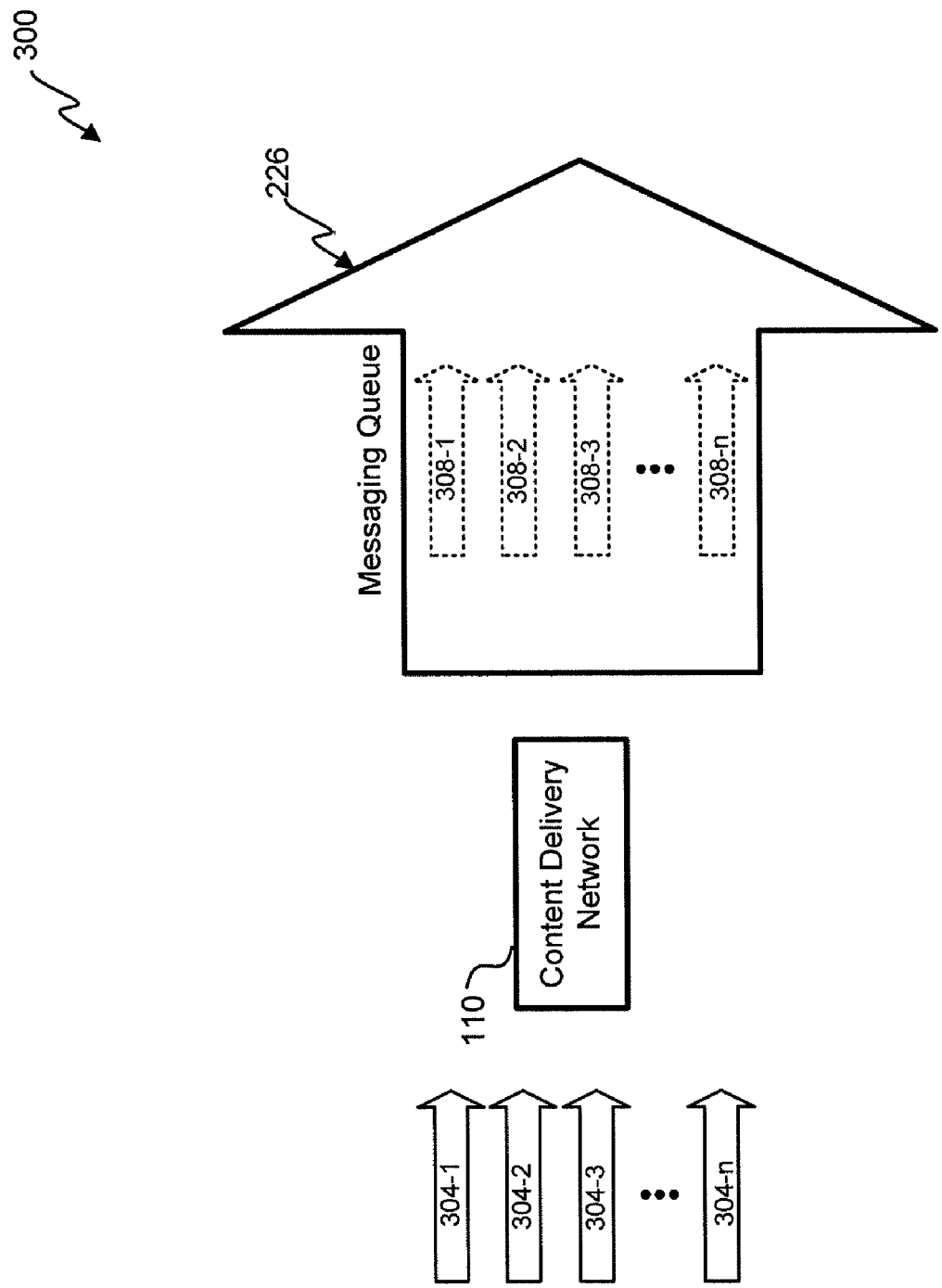
FIG. 3 depicts a diagram of an embodiment that demonstrates data flows.

With reference to FIG. 3, an embodiment of a diagram 300 demonstrating data flows is shown. Gathered information 304 from a number of data agents 208 (not shown) is sent to the CDN 110. Additional gathered information 304 may be gathered within the CDN 110 by internal data agents 208B as described above. A messaging queue 226 is produced by the CDN 110 having a number of content streams 308. Processing subscribers 212 (not shown) outside and within the CDN 110 receive the streams 308 in real time or near real time.

Figure 4:
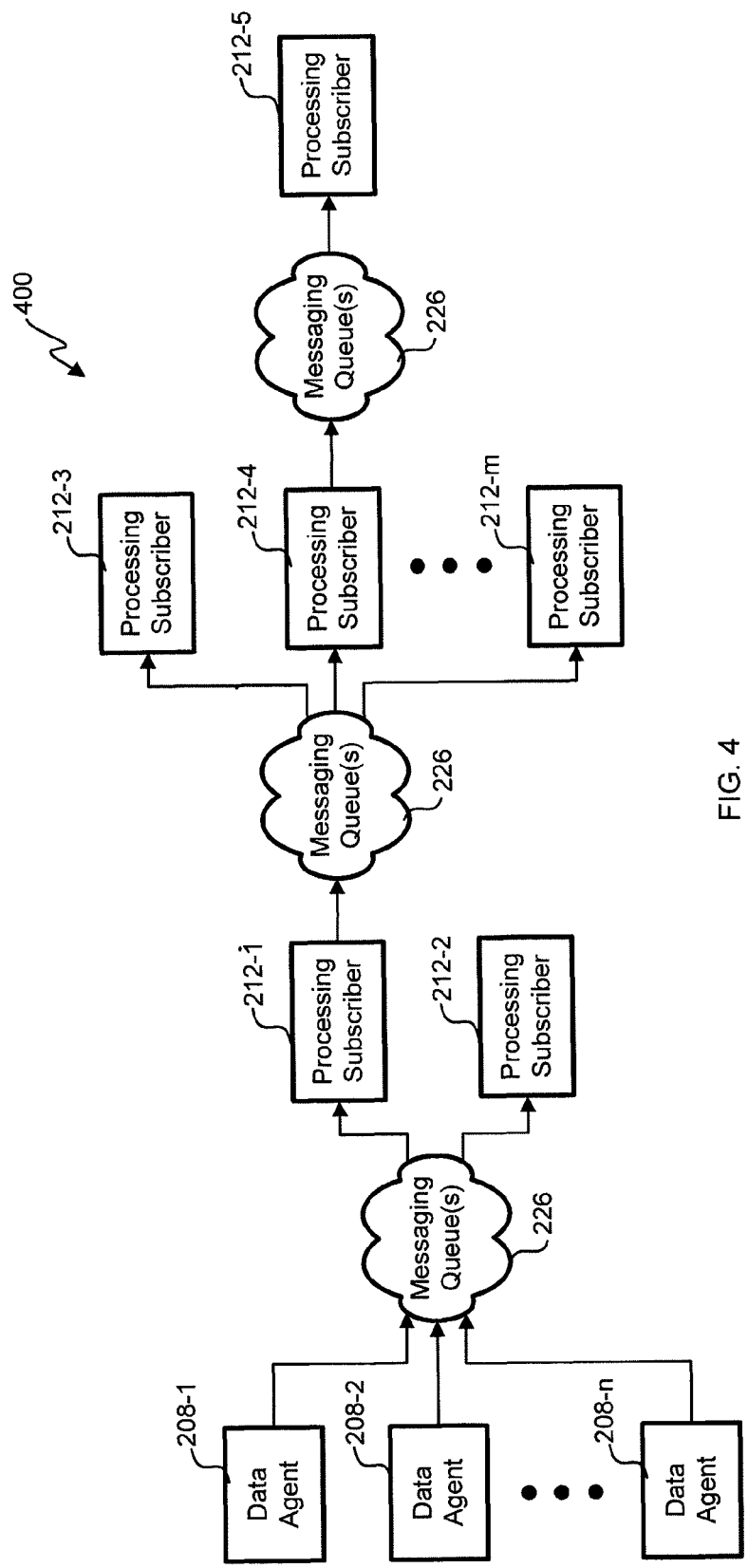
FIG. 4 depicts a block diagram of an embodiment of a processing ring.

Referring next to FIG. 4, a block diagram of an embodiment of a processing ring 400 is shown. This example of a processing ring 400 gathers information 304 from n data agents 208. Some of the information 304 goes through up to three rounds of processing before the end of the processing ring is reached. Some of the processing subscribers 212-2, 212-3, 212-m, 212-5 do not provide their further processed information back to the messaging queue to act as an end point for the information flow that are sometimes referred to as "listening subscribers" herein. Although there are three messaging queues 226 shown, it is to be understood these could the same messaging queue or any number of different messaging queues. The messaging queues 226 could be wholly within the CDN 110 or partially outside the CDN 110 in various embodiments. Certainly, portions of the messaging queues 226 are accessible to external processing subscribers 212A as content streams 308.

In one example, the data agents 208 could be reporting the time it takes to ping a given address. This gathered information 304 is reported in real time (i.e., less than 1 second) or near real time (i.e., less than 10 seconds after gathering) and coupled to the messaging queue 226. In most cases, the gathered information 304 is time stamped to indicate freshness of the raw information. For example, the time the test is performed could be memorialized in the time stamp. Each data agent 208 would report its address, the given address to ping, a ping time, and when the ping test was performed to the messaging queue 226 in this example. The various data agents 208 could be in several POPs 120 of the CDN 110 and third party systems coupled to the CDN 110, for example, an origin server that hosts content could report the responsiveness to pings from its location. Through aggregation of many ping results, the health of the Internet can be monitored in real time or near real time in this example.

In this example, there are two processing subscribers 212-1, 212-2 that are listening to the content streams 308 that are reporting ping results. The second processing subscriber 212-2 is a listening subscriber that does not provide further information to the messaging queue 226, but takes the stream 308 and uses it, for example, to update routing tables for a router. For example, routing tables could be updated by the second processing subscriber 212-2 to specify what are most likely to the most responsive routes on the Internet in real time or near real time. The first processing subscriber 212 takes the stream 308 with ping results from a number of data sources and further processes it by grouping results by autonomous systems (AS) number and reports that gathered and processed information 304 back into the messaging queue 226. Average results grouped by AS number is gathered information that takes far less bandwidth to report to others and avoids having to inspect each and every record in the content stream 308 by processing subscribers 212 further along in the processing ring 400.

There are m processing subscribers 212 listening to the content stream 308 of ping results summarized by AS number. A fourth processing subscriber 212-4 further processes the stream 308 by adding geographic information for the AS numbers. This processing correlates the ping results to geographic estimates for the AS numbers. That gathered information 304 is provided back to the messaging queue 226. A fifth processing subscriber 212-5 listens to the content stream 308 from the messaging queue 226 to receive geographically correlated ping results. Although this processing ring 400 has three levels of processing, other embodiments could have more or less. Additionally, data agents 208 could provide any number of different information 304 that is used in the processing.

Figure 5:
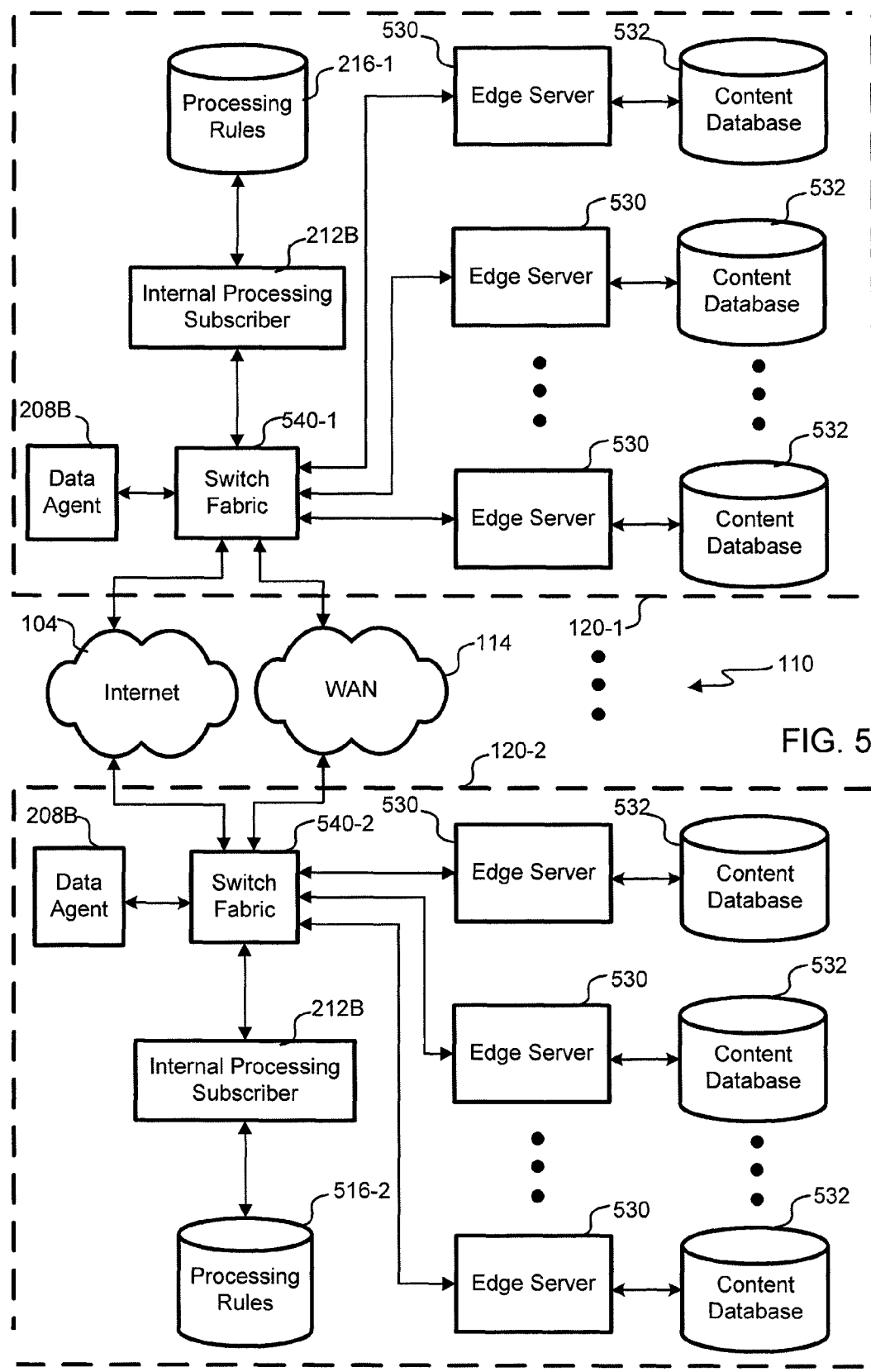
FIG. 5 depicts a block diagram of an embodiment that details portions of a content delivery network (CDN)

Referring next to FIG. 5, an embodiment of a block diagram detailing portions of the CDN 110. This embodiment of the CDN 110 shows two POPs 120, but typically there would be more POPs 120 distributed across the Internet 104 to increase the likelihood a POP 120 is nearby (in a network sense) to the end user systems 102, external processing subscriber 212A or external data agent 208A. Each POP 120 can pass requests, content objects, status information, gathered information 304, content streams 308 etc. between POPs 120 using the Internet 104 and a WAN 114. The WAN 114 couples together the POPs 120 using a private backbone in this embodiment, but could include public networks in other embodiments.

Each POP 120 includes a number of edge servers 530 that service requests from end user systems 102. Through the Anycast routing scheme, requests for content find a particular POP 120 of the CDN 110 that is likely nearby in a network sense to the requestor. This is often a POP 120 well suited to supply the content object, but in some cases another POP is better suited for some reason. For example, an Internet service provider (ISP) may use a proxy in a location geographically distant from the end user system 102 that causes the request for content to find a POP 120 near the proxy instead of near the end user system 102 when Anycast resolution is used to find a nearby POP 120.

The edge servers 530 serve content objects, receive generated information 304 and relay content streams 308. The data input adapter 230 and data output adapter 242 functionality can be implemented within the edge server 530 in this embodiment. The messaging queue(s) 226 are available typically from the WAN 114 in unfiltered form. Those individual content streams 308 subscribed to are provided to a external processing subscriber 212A by the edge server 530 in this embodiment. The processing subscribers 212 subscribed to a given content stream 308 could be grouped to a single edge server 530 where practical.

In this embodiment, the switch fabric 540 receives a request for a content object and assigns an edge server 530 that is typically located in the POP 120 that originally received the request, but not necessarily. The switch fabric 540 can alternatively assign the request to an edge server 530 in another POP 120. A table within the switch fabric 540 indicates a favored POP 120 for certain IP addresses, AS numbers and/or ranges of IP addresses. Where there is no favored POP indicated or the favored POP originally received the request, it is presumed that Anycast acted properly and the POP 120 receiving the request would route the request to an edge server 530 for fulfillment.

An internal data agent 208B monitors the incoming requests for content and notes how Anycast is resolving. Other embodiments could use other ways to resolve to a POP 120 such as single-stage DNS, two-stage DNS, request redirect, etc. The internal data agent 208B notes the IP address of the requestor, resolution technique and the time of the request for reporting that gathered information 308 to the messaging queue 226. Although not shown, external data agents 208A could observe how Anycast is resolving for requests from various IP addresses and report that gathered information 304 to the messaging queue 226. The gathered information includes in each record, the requesting IP address, the location of the POP 120 found with Anycast, the protocol used in the request, the particular request, the time that the request was received and latency, bandwidth, packet loss, jitter, and other QoS factors related to the delivery. An API to the messaging queue 226 is used to gather the records.

To determine if a POP 120 that didn't originally receive the request for a content object is better suited to serve the content object, there are a number of techniques to choose a better POP 120. Third-party location services provide approximate geographic locations for IP addresses, AS numbers and/or portions of IP addresses. An external data agent 208A with the location service provides information 304 when IP addresses, AS numbers and/or groups of IP addresses are correlated to a geographic location. As correlations are made by the service between locations and IP address(es), the external data agent 208A provides that gathered information 304. The internal processing subscriber 212B receives the content stream 308 from the location service(s) along with the content stream from the internal data agents 208B in each POP 120 that report Anycast resolutions.

In addition to using third party location services external to the CDN 110, feedback from deliveries can be used to determine better POPs 120 for particular IP addresses and/or ranges of addresses. An internal data agent 208B (not shown)

within each edge server 530 can determine the latency, bandwidth, packet loss, jitter, and other QoS factors for a particular delivery from a POP 120 and edge server 530 to a particular IP address. That gathered information 304 can be encapsulated into a content stream 308 that is received by the internal processing subscriber 212B. Additionally, third parties making deliveries outside of the CDN 110 with their own servers or using another CDN can provide information with an external data agent 208A that is coupled to the internal processing subscriber 212B by the messaging queue 226. The switch fabric 540 could route according to the suggestion of the location service and where there is no suggestion, switch fabric could route the request to the POP 120 providing the best QoS for that IP address or similar IP addresses based upon information from the content stream 308.

In this embodiment, the internal processing subscriber 212B receives a content stream 308 from one or more geolocation services. Additionally, gathered information 304 from individual deliveries within or outside the CDN 110 are sent in one or more streams 308 to the internal processing subscribers 212B in each POP 120. Processing rules 516 indicate how to interpret the stream 308. For example, there may be weighting in the processing rules to favor delivery results gathered within the CDN 110 in contrast to delivery results gathered outside the CDN 110. Results from deliveries or from geolocation services could be aged in favor of newer results in appreciation of the changing conditions on the Internet 104 in one embodiment.

TABLE

Routing Preferences for Switch Fabric

| POP(s) | Content Object Type | Favored POP |
|---|---|---|
| 000-063.xxx.xxx.xxx | All | Denver |
| 064-127.xxx.xxx.xxx | All | New York |
| 128-171.xxx.xxx.xxx | All | Phoenix |
| 172-256.xxx.xxx.xxx | All | San Jose |
| 128.234.343.xxx | High-bitrate streamed | Chicago |
|  | Small file download | Tempe |
|  | VoIP phone call | Los Angeles |
|  | Web page | Phoenix |
| 128.234.343.123 | High-bitrate streamed | New York |
|  | Flash | Denver |
|  | VoIP phone call | Denver |
|  | Remainder | San Jose |
| 129.xxx.xxx.xxx | High-bitrate streamed | Tempe |
|  | Small file download | Tempe |
|  | Large file download | Denver |
|  | Remainder | Chicago |
| 130.001.xxx.xxx | Low-bitrate streamed | Los Angeles |
|  | Small file download | San Jose |
|  | Gaming | Los Angeles |
|  | Web page | San Jose |

For different types of content objects, different metrics may be more important for deciding the favored POP. For example, streaming video generally favors higher bandwidth over latency. When the switch fabric 540 receives a request for streaming video, the switch fabric 540 may prefer one POP 120, but could prefer a different POP 120 for a request for a small content file download or content stream 308. The above Table shows an example of some of the routing preferences within the switch fabric 540 that would be used in choosing an edge server 530 between the POPs 120. It is to be understood that there would be far more table entries in a typical embodiment of routing preferences. In some cases, there are ranges of various sizes and even specific addresses specified for special handling with the switch fabric 540.

Where there are multiple entries for a particular IP address, the most specific range would be favored over the broader ranges. For example, a request from IP address 128.234.343.123 would have the entry for that specific address and entries for the 128-171.xxx.xxx.xxx and 128.234.343.xxx ranges. In this case, the 128.234.343.123 entry would be used instead of the entry for any range because IP address is more specific. If the request were for a small file download however, the entry for the 128.234.343.xxx range would be used since the 128.234.343.123 entry has no routing preference for a small file download such that the delivery would be from the Tempe POP regardless of which POP 120 originally received the request using Anycast. As the content stream 308 is received, the content stream 308 is processed and applied to routing preferences for all entries that correspond to the information gathered for a particular address such that the Table is changing in real time or near real time.

This embodiment shows an internal processing subscriber 212B in each POP 120 locally processing the content stream 308 to adjust the switch fabric 540 for those times that Anycast does not resolve a request to a favored POP 120. Other embodiments could adjust how the switch fabric 540 resolves requests in different ways. There could be embodiments that don't have an internal processing subscriber 212B in each POP 120 for programming the switch fabric 540. One location in the CDN 100 would have the internal processing subscriber 212B that would also include an internal data agent 208B (not shown) that sends information 304 to those POPs 120 not processing the rules locally to affect the switch fabric 540.

The internal processing subscriber 212B in each POP 120 could produce the table of preferred POPs 120 according to the processing rules 516 applied to the content stream 308. The table of preferred POPs 120 for various IP addresses of requests are routed by the switch fabric 540 to the preferred POP 120 to effectively override the Anycast distribution of requests. On occasion, the geolocation service and Anycast routing may not find a POP 120 with adequate QoS, better QoS or the best QoS. When QoS falls below a threshold in one or more metrics, and the Anycast and geolocation service is not finding an adequate solution above the threshold, another algorithm can be used to find a better POP 120 to perform the delivery for an IP address or range of IP addresses. The switch fabric 540 can this algorithm to assign a POP 120 in a random, unpredictable or round-robin fashion. One embodiment might assign the next closest POP 120.

After the delivery with the POP 120 chosen in any of these fashions, the results of how the delivery was performed is reported back to the internal processing subscriber 212B with the appropriate content stream 308. If the delivery has higher QoS, the POP 120 would become the new choice for similar requests. In some cases, a number of different POPs 120 could be tested with actual deliveries or test deliveries of content objects. This probing for better POP 120 assignments could be done periodically even if QoS doesn't fall below a threshold as the performance of the Internet 104 changes over time. Requests from IP addresses with historically unpredictable QoS could be targeted more often to probe for a better POP 120.

Figure 6:
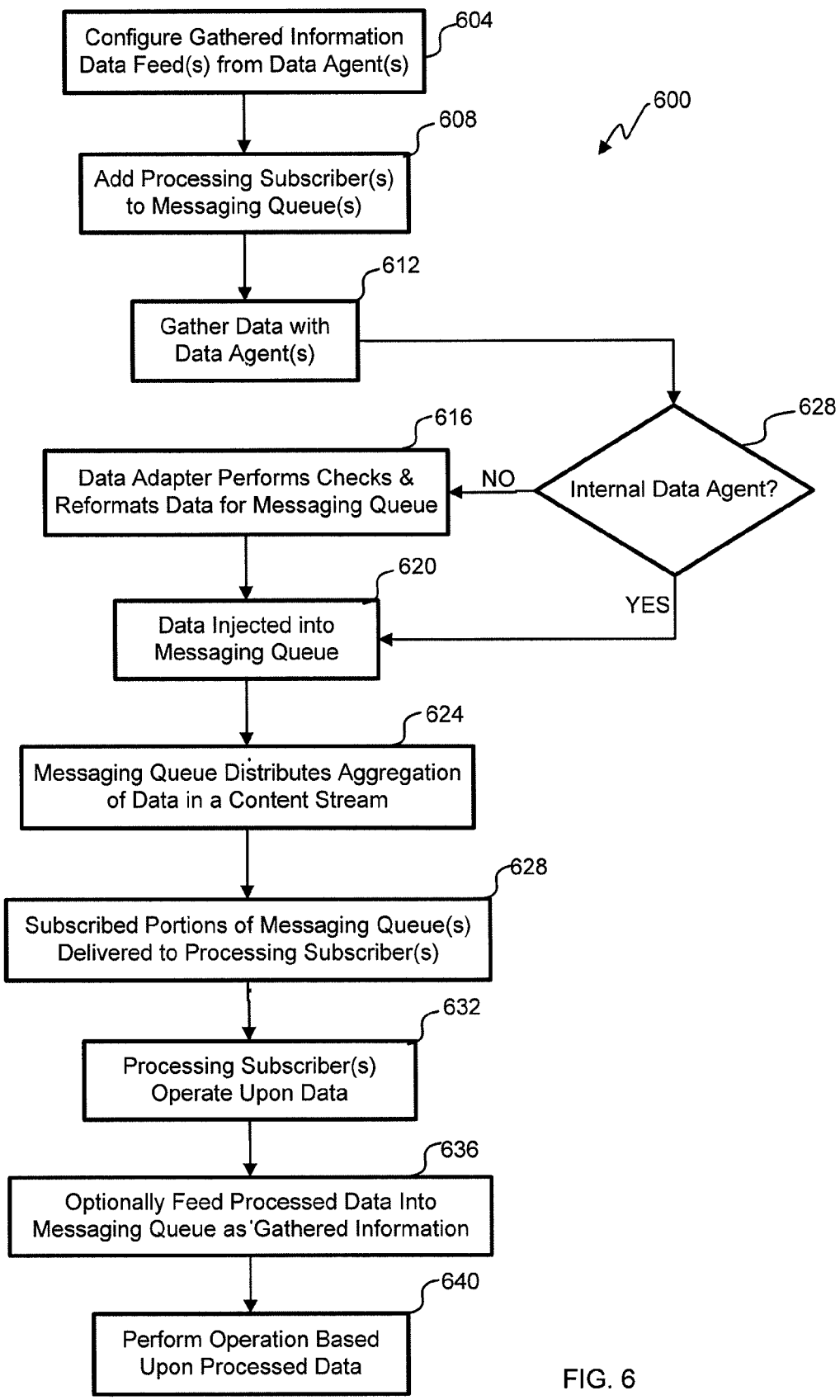
FIG. 6 illustrates a flowchart of an embodiment of a process for operation of the data processing system.

With reference to FIG. 6, an embodiment of a process 600 for operation of the data processing system 200 is shown. The depicted portion of the process begins in block 604 where the developer would use the CC interface 238 to manage the interaction between the data agents 208 and the messaging queue 226. The developer inputs the API design where there is not one pre-defined, address of the data agent 108, authentication and authorization information for any external data agents 208A, etc. into the CC interface 238. The API design specifies the types of variables, how they are formatted and other information to describe the gathered information 304 in the data feed to the messaging queue 226. The API design also defines how the gathered information 304 is portrayed when sent from the messaging queue 226 as a content stream 308. The content stream 308 has records or samples that are defined by the API design.

In block 608, the developer chooses the available content streams 308 in the messaging queue 226 for use by a particular processing subscriber 212. A given content stream 308 chosen may only have records from the data agents 208 previously configured in block 604 or could include records of third parties from other data agents 208. Each record in the content stream 308 could be serialized or include the data agent address as a mechanism to differentiate records. Additionally, the developer interacts with the data processing system 200 to input API information, address of the processing subscriber 212, authentication and/or authorization information, etc. into the CC interface 238 to configure a particular processing subscriber 212 to interact with the messaging queue 226 of the CDN 110. All queue subscription information is recorded for each processing subscriber 212 in the queue subscription information database 222.

The input gathered information 304 and output content stream 308 for the messaging queue 226 is configured at this point by the developer. The developer also configures the processing rules 216 for the processing subscriber 212 to use when operating upon its content stream(s) 308 from the messaging queue 226. The processing rules 216 may or may not be stored within the CDN 110. The developer may find it helpful to check the rule operation against the historical datastore 234 when designing the rules to provide test results from a prior content stream(s) 308. Many levels of data agents 208 and processing subscribers 212 can be defined in blocks 604 and 608 to define a processing ring.

With reference to block 612, operation of the developer's data processing system begins when the data agent(s) 208 reports gathered information 304. The data processing system 200 could have any number of data agents 208 internal or external to the CDN 110. External data agents 208A generally use data input adapters 230 as described above. External processing subscribers 212A generally use data output adapters 242. Any configuration of the external data agents 208A or external processing subscribers 212A can be performed with the CC interface 238.

Where the data agent 208 is an external data agent 208A, as determined in block 628, a data adapter 230 checks, reformats and/or performs other processing on the gathered information 304 in block 616. The checks may include authentication and/or authorization, for example, or checks on formatting, data types, valid data ranges, etc. Internal data agents 208B, as determined in block 628, can optionally skip block 616 going directly to block 620. After the data is available within the CDN 110 and optionally checked by a data adapter 230, the gathered information 304 is injected into the messaging queue 226 in block 620. The messaging queue 226 distributes gathered information in block 624 that is comprised of a series of messages, packets, samples, or records in a particular category that are collectively referred to as a content stream 308. Because gathered information 304 is produced by the data agents 208 often in real time and reported to the messaging queue 226 without delay, the gathered information 304 is quickly made available in real-time or near real-time, for example, the data may be less than one, two, five, ten, or twenty seconds old when it enters the messaging queue 226.

According to the subscription information 212, the content streams 308 are distributed in multicast and/or unicast fashion to the various processing subscribers 212 within the CDN 110 or anywhere on the Internet in block 624. Typically, multicast is used for processing subscribers 212 within the CDN 110 or that have networks that support multicast, and parallel unicast streams are used for external processing subscribers 212B that do not have network support for multicast. Each processing subscriber 212 can only read the content streams 308 in block 628 that it subscribes to. Authentication and/or authorization using, for example, encryption, can be use to protect streams 308 or sub-streams from exposure to non-subscribers. According to the processing rules 216, each processing subscriber 212 operates on its one or more content streams 308 from the massaging queue 226 in block 632.

A processing subscriber 212 can optionally return the processed information 304 back into the messaging queue 226 in block 636 by also acting as a data agent 208 unlike listening subscribers that do not include capability to act as data agent 208. Although not required, processing subscribers 212 typically perform an operation or action in block 640 based, at least in part, on the information 304 gathered from the content stream 308. Any type of action such as ordering supplies, granting access, provisioning a customer, closing down systems, routing traffic differently, choosing of repurposing resources, etc. could be performed in various embodiments.

Figure 7:
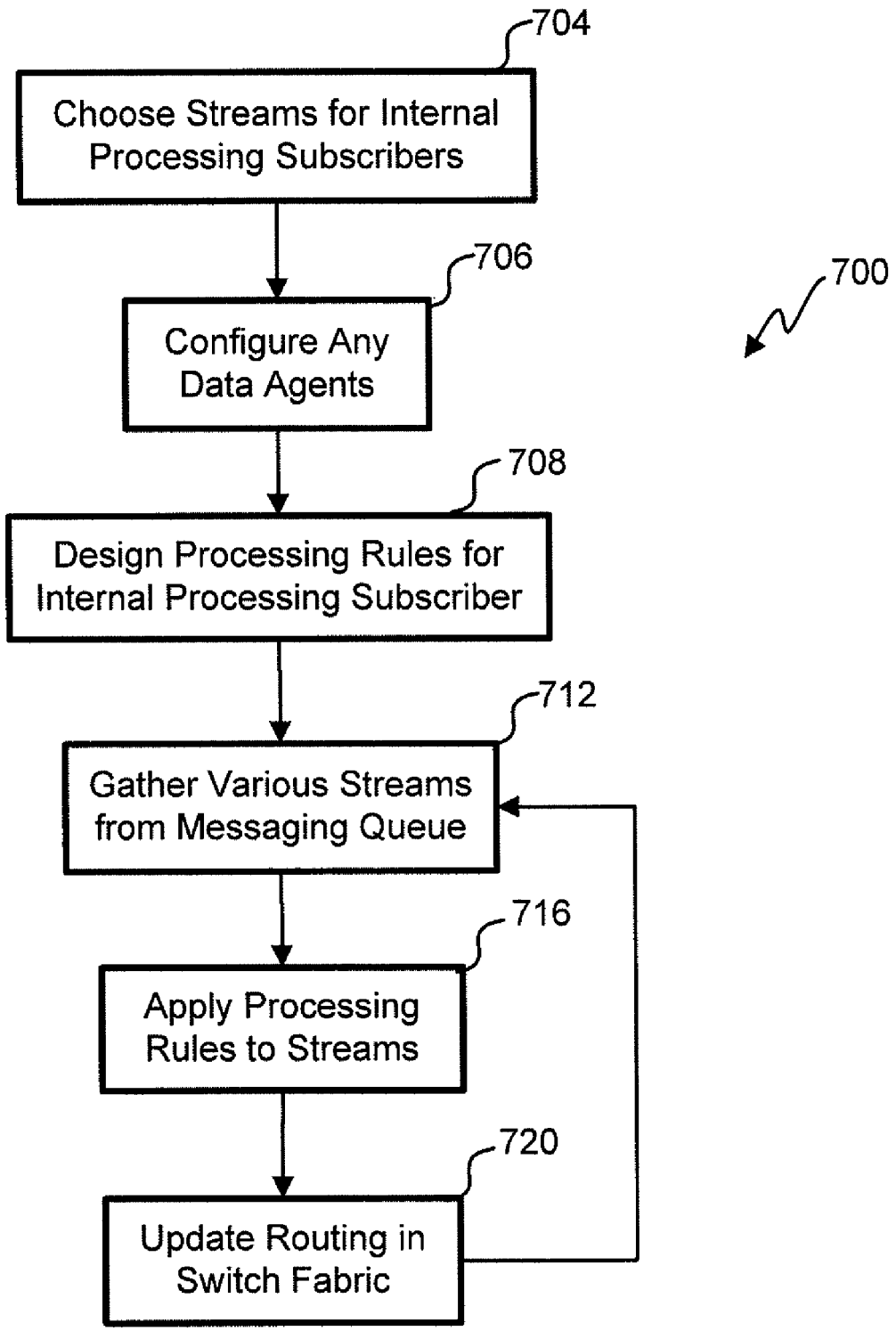
FIG. 7 illustrates a flowchart of an embodiment of a process that configures an internal processing subscriber.

Referring next to FIG. 7, an embodiment of a process 700 is shown that configures an internal processing subscriber 212B to aid in improved routing of a request for content to an edge server 530 who services that request. When explaining the process 700, an example of improving upon Anycast routing is used in conjunction with the embodiment shown in FIG. 5. The depicted portion of the process 700 begins in block 704 where the content streams 308 are chosen to be supplied to the internal processing subscriber 212B of each POP 120. Content streams 308 having delivery metrics and location estimations are chosen for delivery to the internal processing subscriber 212B from the messaging queue 226. For example, the gathered information from: (1) geolocation services that provide estimates of location based upon an IP address, and/or (2) internal/external information gathered on content delivery between two IP addresses could be passed to the internal processing subscriber 212B from the messaging queue 226.

In this example, each POP 120 includes an internal data agent 208B that gathers information 304 on each content delivery. Although shown separate from the internal processing subscriber 212B, the internal data agent 208B could be integral to the internal processing subscriber 212B. The internal data agent 208B is configured to report content delivery results information 304 to the messaging queue 226. This embodiment could use gathered information 304 gathered from deliveries outside the CDN 110, but that is not necessary as Anycast routing could be refined solely from internally gathered information 304 provided by each POP 120.

In block 708, processing rules 516 are designed. The internal processing subscriber 212B uses the processing rules 516 to analyze, process, reformat, etc. the subscribed content streams 308. For example, a content stream 308 reporting external delivery results between two IP addresses could have a processing rule that matches the source IP address with the most similarly situated POP 120 by inferring that the source IP address was close to the POP's IP address and those delivery results could be used by that POP 120 if there weren't any internally gathered delivery results that were deemed more reliable. For example, the IP address of the source of a particular delivery could be determined to correspond to a Denver located POP 120 and the delivery result could be presumed to be similar to a delivery results from the Denver POP 120 of the CDN 110. If the delivery from the Denver source IP address were better than that seen from other POPs 120 of the CDN 110, the routing-preferences Table could be updated to improve how the switch fabric 540 assigns the next request to an edge server 530 when the Denver POP 120 is likely to have higher QoS for the requestor's IP address or a range of similarly situated IP addresses. If the Phoenix POP 120 received a request that indicated that the Denver POP 120 delivered to the IP address of the request better, for example, the switch fabric 540 would send the request to the Denver POP 120 for fulfillment.

The messaging queue 226 distributes the various content streams 308 to the various processing subscribers 212 that have requested those content streams 308. In block 712, the various streams 308 that the internal processing subscriber 212B has signed-up for are received as the information 304 is reported through the messaging queue 226. In this example, the internal processing subscriber 212B in each POP 120 would receive a multicasted content stream 308 from the WAN 114, which supports multicasting protocols. The processing rules 516 are applied to the streams 308 as information is received by the internal processing subscribers 212B. The routing preferences Table in the switch fabric 540 are updated in block 720 as information in the content streams 308 is processed to provide real time or near real time reaction to how the Internet 104 is delivering content at any moment. After block 720, processing loops back to block 712 to gather more records from the content stream 308 for processing in a loop of blocks 712, 716 and 720.

Figure 8:
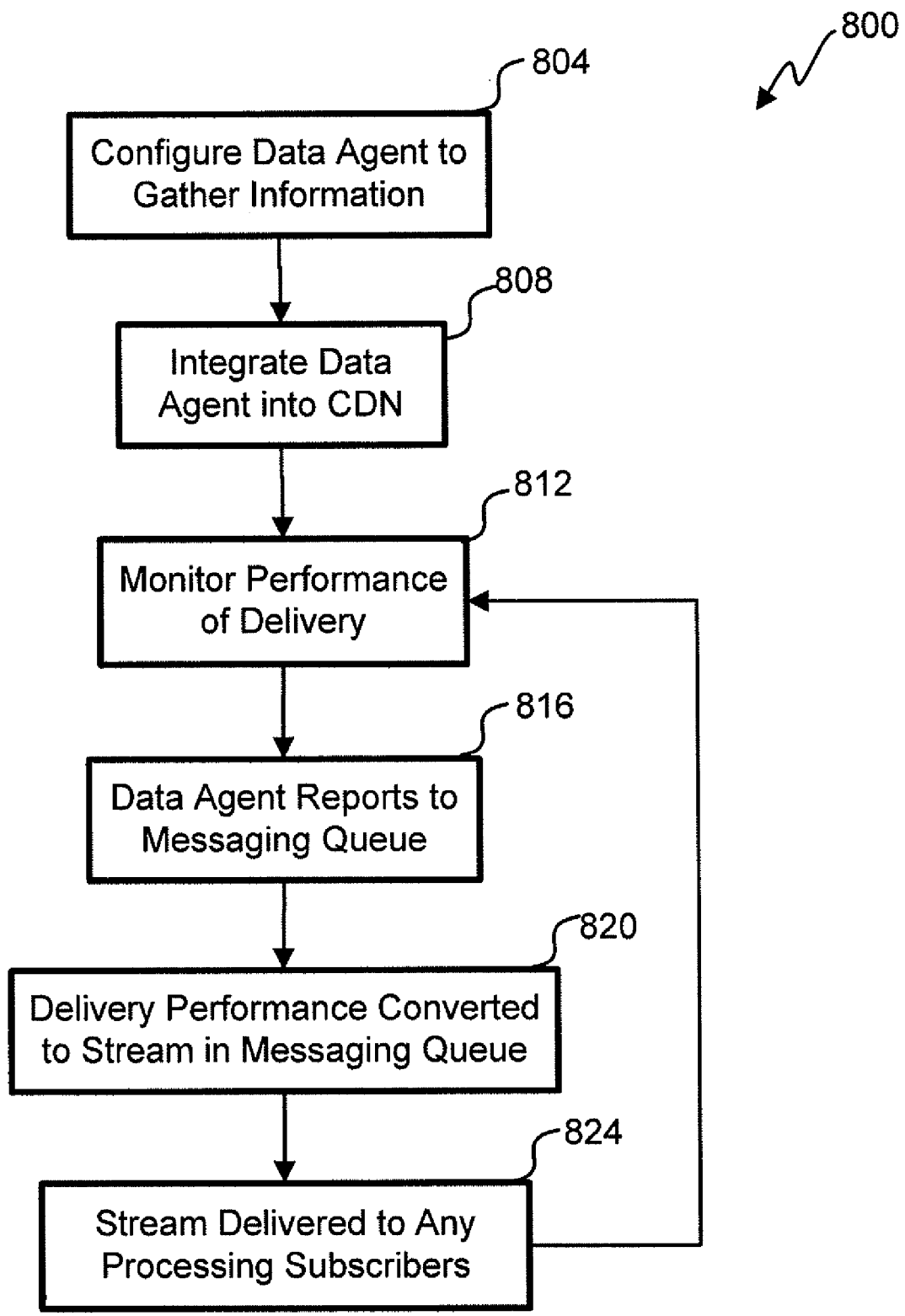
FIG. 8 illustrates a flowchart of an embodiment of a process for setting up a data agent and using the data agent to report information to a messaging queue.

With reference to FIG. 8, an embodiment of a process 800 for setting up a data agent 208 and using the data agent 208 to report gathered information 304 to the messaging queue 226 is shown. When explaining the process 800, an example used for improving Anycast routing will be used in conjunction with the embodiment shown in FIG. 5, but it is to be understood that the general idea of a messaging queue 226 could be used for many different purposes. The depicted portion of the process 800 begins in block 804 where the data agent 208 is configured to gather information. The data agent 804 is typically software that may interface to sensors, data sensing equipment and/or data gathering equipment of various configurations. In this example, the data agent 208 measures various parameters associated with delivering a content object between two IP address. A physical location of the source IP address and possibly even the location of the destination IP address may also be known and reported to the API as a data record in the gathered information 304. Other demographic information on the sender and/or receiver could be reported in addition to physical location.

The record for a particular delivery is sent as gathered information 304 and can be determined using an edge server 530 and/or information from the end user system 102. For example, a set top box that acts as an end user system 102 could report to the edge server 530 the latency and data rate of the delivery of a content object. Some embodiments could test the link between edge server 530 and end user system 102. The data agent 208 is configured to reformat the gathered information according to an API of the CDN 110.

The data agent 208 is integrated into the CDN 110 in block 808. Integration could include interaction with the CC interface 238 as described above. The data agent 208 may be a dedicated server or a piece of test equipment or may be software that runs on an existing server or piece of test equipment. Integration of the data agent 208 may include providing authorization and/or authentication information that an external data agent 208A would use when reporting information to the CDN 110. In block 812, the delivery performance is monitored between two IP addresses. Monitoring of delivery can take place on either end of the delivery and be reported in the record. The data agent 208 reports information 304 regarding each delivery to the messaging queue 226 in block 816.

The gathered delivery information 304 is converted into a stream 308 by the CDN 110 in block 820 as the messaging queue 226. Some embodiments can mask the provider of the gathered information 304 by modifying or obscuring IP addresses, business names, identifiers or other information that could be traced back to the provider. Additionally, privacy rules could be applied to gathered information to sanitize it prior to reaching the stream 308. The privacy rules could allow some subscribers to see some information while others could not see that information. The various processing subscribers 212 that request the content stream 308 are sent the content stream 308 using parallel unicast streams, broadcast and/or multicast in block 824. For processing subscribers 212 within the CDN 110, the streams can be sent with multicast and with parallel unicast outside the CDN 110 in one embodiment. After block 824, processing loops back to block 812 to loop through blocks 812, 816, 820 and 824 to report records as gathered information 304 for distribution as content streams 308 by the messaging queue 226.

Figure 9A:
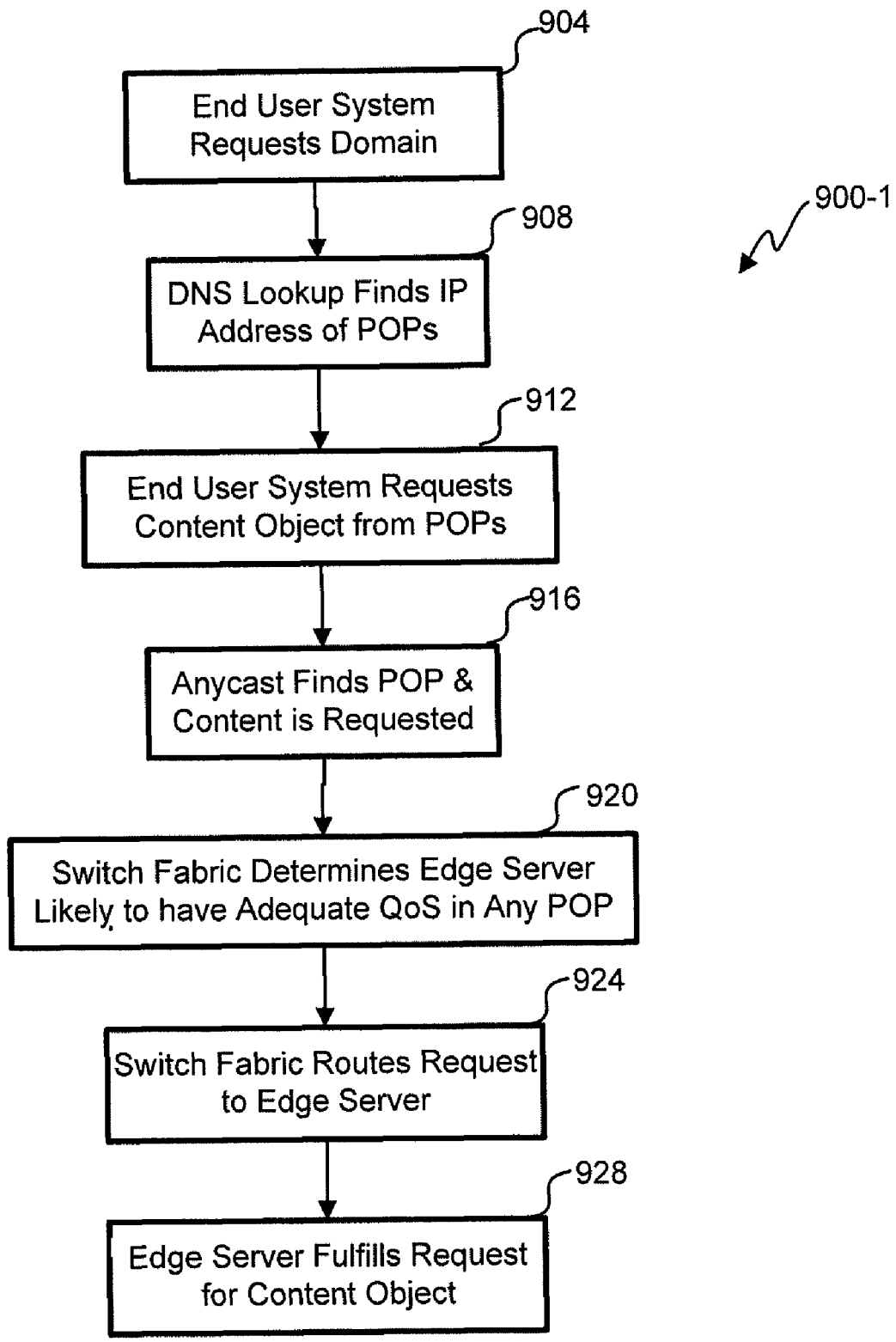
FIGS. 9A and 9B illustrate flowcharts of embodiments of a process for improving upon Anycast routing.

Referring next to FIG. 9A, a flowchart of an embodiment of a process 900-1 for improving upon Anycast routing is shown. The depicted portion of the process 900-1 begins in block 904 where an end user system 102 requests translation of a domain name into an IP address from a domain name service (DNS). The DNS performs a lookup to find the IP address for the domain in block 908. The IP address corresponds to a number of POPs 120 for the CDN 110 according to an Anycast routing scheme. Once the IP address is known, the end user system 102 requests the content object at the IP address of many POPs 120 in block 912.

Only one POP 120 ultimately receives the content request as the various routers will choose the routing to find the POP 120. The content is requested from the POP in block 916. In block 920, the switch fabric 540 determines the edge server 530 to route the request to. The edge server 530 is in the current POP 120 if Anycast routing has not been overridden. Loading, edge server capability, cache utilization, bandwidth utilization, random, or round robin schemes can be used to choose a particular edge server from many edge servers in a particular POP 120.

Based upon analysis of the content stream, another edge server 530 in another POP 120 can be chosen when it is deemed that delivery to the IP address of the end user system 102 may work better. The edge server 530 in the other POP 120 would be routed the request in that circumstance. The edge server 530 is chosen by the other POP 120 according to one embodiment, but in this embodiment, the switch fabric 540 of the current POP 120 chooses the particular edge server 530 in the other POP 120. The switch fabric 540 routes the request to the chosen edge server 530 in block 924. The edge server fulfills the request for the content object in block 928.

Figure 9B:
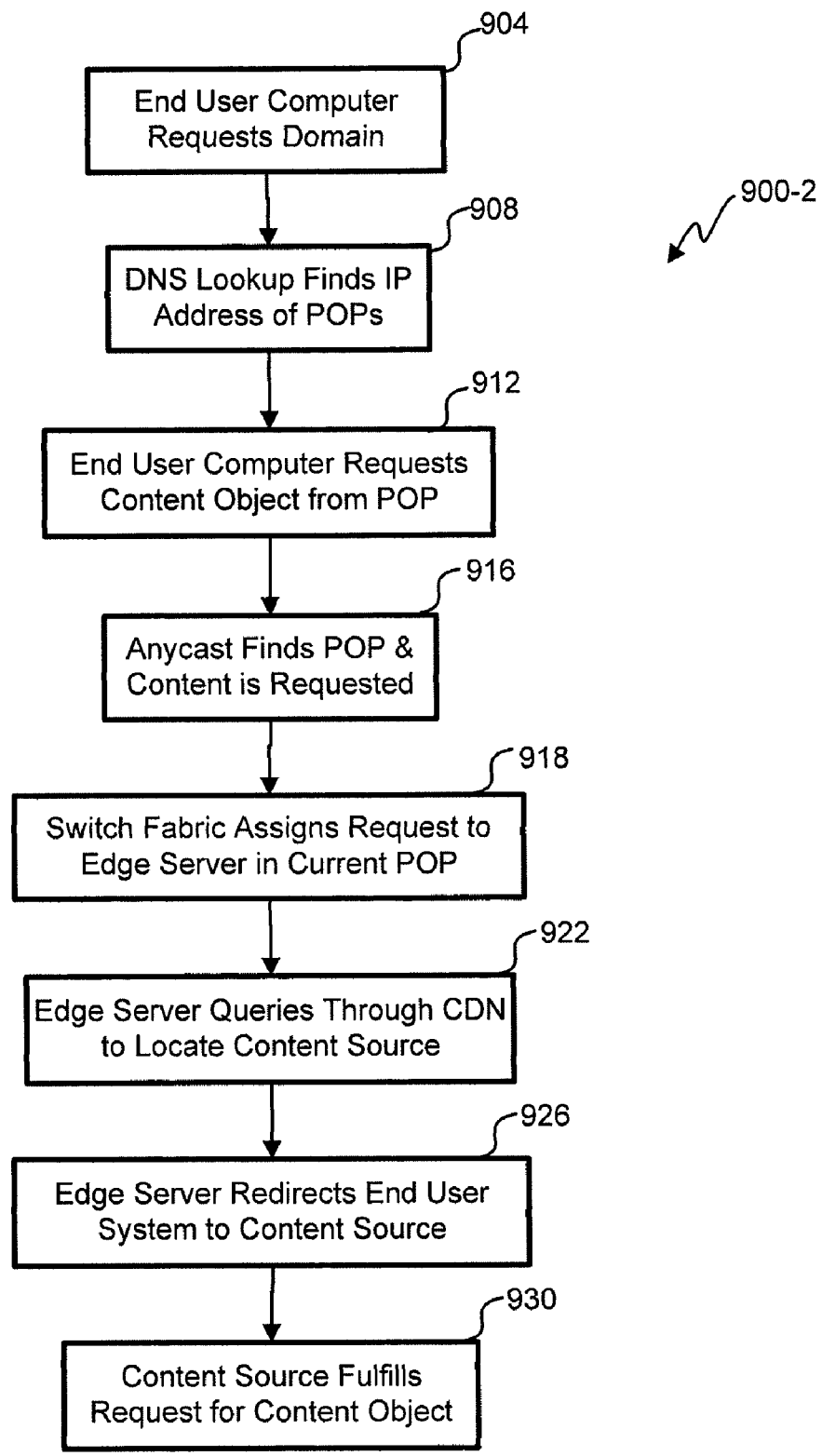

With reference to FIG. 9B, a flowchart of another embodiment of a process 900-2 for improving upon Anycast routing is shown. The depicted portion of the process 900-2 follows the embodiment of FIG. 9A for blocks 904, 908, 912, and 916. After block 916, the switch fabric 540 assigns the request to an edge server 530 in the current POP 120 in block 918. Different POPs 120 are favored to deliver different content objects. In this embodiment, the edge server 530 favored to deliver a content object is found within the CDN 110 regardless of POP 120 in block 922. A favored edge server 530 may be favored because it already stores the content object, is less loaded resources and/or bandwidth, it is likely to deliver higher QoS, is closer to the requester in a network sense, has better resources, has specialized software to support the request, or has some other factor or characteristic.

If the edge server 530 is not favored to deliver the requested content, the edge server 530 queries throughout the CDN to find another edge server 530. In this embodiment, an edge server is not favored when it has not cached or stored the content object. Each edge server 530 has a table that specifies a parent server to query for finding a favored edge server 530 that has cached or stored the content object. The table may have different parent servers for a content objects or groups of content objects. That parent server may query to another parent server if the content object is not stored or cached. This process can continue until even the origin server is determined to be the only server in the chain that has the content object stored.

Once the source of the content object is found, the source is relayed back through the chain of ancestors to the original edge server 530 that was initially assigned the request. The original edge server 530 returns a redirect to the end user system 102 in block 926. The redirect causes the end user system 102 to request the content object from the content source. In block 930, the content source fulfills the request for the content object. In this way, the end user system 102 can be directed to another POP, a host server or even the origin server.

A number of variations and modifications of the disclosed embodiments can also be used. For example, the CDN could operate the messaging queue intake and outtake as a service on the Internet. Any collection of entities or businesses could use the CDN to share information in a collective manner that would benefit from certain information even if it is from a competitor. With increasing numbers of different categories and types of streams that are present on the messaging queue, the more different types of information can be taken into account when making a decision. Some embodiments use processing rules to weight different sources in the stream differently. Routing, for example, could have a weighting algorithm to favor internally gathered results over results from another source of gathered information.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the disclosure.

What is claimed is:

1. A content delivery network (CDN) for delivering content of others with the Internet using a plurality of point of presences (POPs), the CDN comprising:
   a first POP accessible using an Internet protocol (IP) address, wherein the first POP comprises a plurality of first edge servers that each are configured to deliver content to end user devices;
   a second POP accessible using the IP address, wherein:
   the plurality of POPs comprise the first POP and the second POP,
   the second POP is geographically separated from the first POP, and
   the second POP comprises a plurality of second edge servers that each are configured to deliver content to end user devices; and
   a switch fabric within the CDN that assigns a request for content received at the first POP to one of the plurality of second edge servers when the second POP is determined likely to provide improved delivery of the content object of the request, the request having been resolved by a Domain Name System (DNS) prior to therequest being received at the first POP,
   wherein the switch fabric assigns the request to the second POP without further action by an end user device which initiated the request for content.

2. The CDN for delivering content of others with the Internet using the plurality of POPs as recited in claim 1, wherein the first and second POPs share the same IP address according to an Anycast routing scheme.

3. The CDN for delivering content of others with the Internet using the plurality of POPs as recited in claim 1, wherein the switch fabric is distributed with portions within both the first POP and the second POP.

4. The CDN for delivering content of others with the Internet using the plurality of POPs as recited in claim 1, further comprising:
   a first data agent to gather delivery statistics for requests serviced by the first POP;
   a second data agent to gather delivery statistics for requests serviced by the second POP; and
   a message queue that aggregates delivery statistics from the first data agent and the second data agent, wherein the aggregated delivery statistics are streamed to the switch fabric to affect assignment of the request.

5. The CDN for delivering content of others with the Internet using the plurality of POPs as recited in claim 1, further comprising a messaging queue, which gathers delivery statistics from the first POP and the second POP to produce a stream, which affects how the switch fabric assigns requests among the plurality of POPs.

6. The CDN for delivering content of others with the Internet using the plurality of POPs as recited in claim 1, further comprising a messaging queue, which gathers delivery statistics from at least one of the first POP and/or the second POP and a third party not under the control or within the domain of the CDN to produce a stream of delivery statistics, which affects how the switch fabric assigns requests among the plurality of POPs.

7. The CDN for delivering content of others with the Internet using the plurality of POPs as recited in claim 1, further comprising a processing subscriber that receives information gathered inside and outside the CDN to affect how the switch fabric assigns requests to POPs.

8. A method for assigning delivery resources in a CDN between a plurality of POPs, the method comprising:
   receiving a request to deliver a content object to an end user at a first POP, the request having been resolved by a DNS prior to being received at the first POP, wherein:
     the first POP comprises a plurality of first edge servers,
     the plurality of POPs includes the first POP and a second POP, and
     the first POP is geographically distant from the second POP;
   determining that the second POP is likely to provide improved delivery of the content object to the end user in comparison to the first POP, wherein:
     the second POP comprises a plurality of second edge servers, and
     the first POP and the second POP are accessed from the Internet with a same IP address; and
   assigning the request, via a switch fabric within the CDN, to one of the plurality of second edge servers,
   wherein the assigning the request to the second POP occurs without further action by an end user device which initiated the request for content.

9. The method for assigning delivery resources in the CDN between a plurality of POPs as recited in claim 8, further comprising processing information gathered inside and outside the CDN to affect the determining.

10. The method for assigning delivery resources in the CDN between a plurality of POPs as recited in claim 8, wherein the assigning the request includes issuing a redirect to an end user system to assign the request to one of the plurality of second edge servers.

11. The method for assigning delivery resources in the CDN between a plurality of POPs as recited in claim 8, wherein the determining takes into account network proximity of an originator of the request and the plurality of POPs.

12. The method for assigning delivery resources in the CDN between a plurality of POPs as recited in claim 8, further comprising:
   gathering first delivery results from the first POP and second delivery results from the second POP into a stream; and
   coupling the stream to routing fabric that assigns the requests between the plurality of POPs.

13. The method for assigning delivery resources in the CDN between a plurality of POPs as recited in claim 8, wherein the first and second POPs share the same IP address according to an Anycast routing scheme.

14. The method for assigning delivery resources in the CDN between a plurality of POPs as recited in claim 8, further comprising:
   gathering delivery statistics from the first POP and the second POP to produce a stream; and
   processing the stream to assign requests among the plurality of POPs.

15. A machine-readable non-transitory medium having machine-executable instructions configured to perform the machine-implementable method for assigning delivery resources in a CDN between a plurality of POPs of claim 8.

16. A method for assigning delivery resources in a distributed delivery network having a plurality of POPs that uses Anycast to assist in assigning content requests, the method comprising:
   receiving a request to deliver a content object to an end user at a first POP, the request having been resolved by a DNS prior to being received at the first POP, wherein the plurality of POPs includes the first POP and a second POP;
   determining that the second POP is likely to provide improved delivery of the content object to the end user in comparison to the first POP, wherein:
     the plurality of POPs comprise the first POP and the second POP,
     first and second POPs share the same IP address,
     the first POP is geographically distant from the second POP, and
     the first POP and the second POP are accessed from the Internet using a same IP address; and
   re-assigning the request, with a switch fabric within the CDN, to the second POP for delivery of the content object to the end user,
   wherein the assigning the request to the second POP occurs without further action by an end user device which initiated the request for content.

17. The method for assigning delivery resources in the distributed delivery network having the plurality of POPs that uses Anycast to assist in assigning content requests as recited in claim 16, further comprising processing information gathered inside and outside the distributed delivery network to affect the determining.

18. The method for assigning delivery resources in the distributed delivery network having the plurality of POPs that uses Anycast to assist in assigning content requests as recited in claim 16, wherein the determining takes into account network proximity of an originator of the request and the plurality of POPs.

19. The method for assigning delivery resources in the distributed delivery network having the plurality of POPs that uses Anycast to assist in assigning content requests as recited in claim 16, further comprising:
   gathering first delivery results from the first POP and second delivery results from the second POP into a stream; and
   coupling the stream to routing fabric that assigns the requests between the plurality of POPs.

20. The method for assigning delivery resources in the distributed delivery network having the plurality of POPs that uses Anycast to assist in assigning content requests as recited in claim 16, further comprising:
   gathering delivery statistics from the first POP and the second POP to produce a stream; and
   processing the stream to assign requests among the plurality of POPs.

* * * * *